United States Patent [19]

Lack et al.

[11] 4,053,087
[45] Oct. 11, 1977

[54] DISPENSER FOR GRANULAR MATERIAL

[75] Inventors: Bryan Edward Charles Lack; Alec Thomas Newman, both of Banbury, England

[73] Assignee: General Foods Limited, Banbury, England

[21] Appl. No.: 635,840

[22] Filed: Nov. 28, 1975

[51] Int. Cl.² ............................................. G01F 11/10
[52] U.S. Cl. ................................... 222/278; 222/339; 222/359; 222/363; 222/498
[58] Field of Search ............... 194/63; 222/57, 278, 222/359, 362, 363, 498, 339, 364, 426; 221/266, 271

[56] References Cited

U.S. PATENT DOCUMENTS

| | | | |
|---|---|---|---|
| 506,552 | 10/1893 | Sample | 222/363 X |
| 1,419,946 | 6/1922 | Schaffer | 222/57 UX |
| 3,272,399 | 9/1966 | Dight | 222/498 X |
| 3,430,746 | 3/1969 | Bolen | 194/63 |

Primary Examiner—Robert B. Reeves
Assistant Examiner—David A. Scherbel
Attorney, Agent, or Firm—Bruno P. Struzzi; Howard J. Newby; Mitchell D. Bittman

[57] ABSTRACT

A dispenser for granular material such as sugar and coffee or other beverage ingredients, having a bucket-type valve assembly which assures accurate dispensing of predetermined amounts of the desired material through a quick-acting spring device. A coin operated latch mechanism can be used for actuation of the dispenser.

3 Claims, 7 Drawing Figures

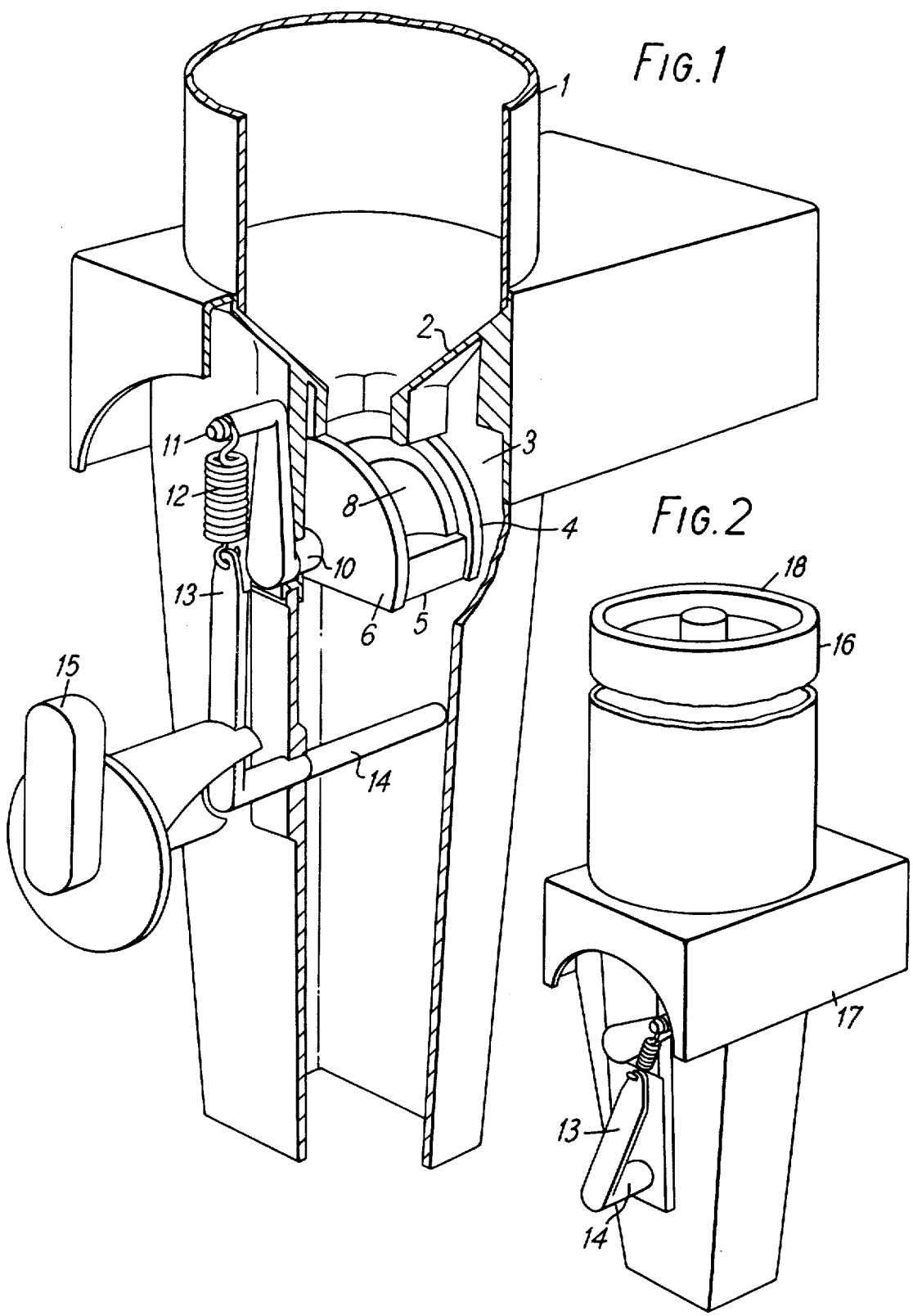

DISPENSER FOR GRANULAR MATERIAL

BACKGROUND OF THE INVENTION

1. Field of the Invention

This invention relates to a dispenser for dispensing predetermined amounts of particulate or granular material. In particular, the invention is concerned with a dispenser for dispensing powdered sugar, coffee or other beverage ingredients and the invention will be particularly described with reference to a sugar dispenser.

2. Description of the Prior Art

United Kingdom Patent Specification No. 1,024,287 describes and claims a dispenser for a fluent material, comprising a container, a material outlet neck extending downwardly from said container, a butterfly valve in said neck comprising a spindle piercing the neck and valve vane thereon, and valve operating means adapted to shift said butterfly valve rapidly from one closed position through an intermediate open position to another closed position.

SUMMARY OF THE INVENTION

The present invention provides a dispenser which is an improvement over the prior art dispenser mentioned above, the main distinguishing feature being the provision of a bucket valve in place of the aforesaid butterfly valve. The use of a bucket valve enables predetermined amounts of the desired material to be dispensed with greater precision than in the prior art dispenser and the configuration of the several operating parts of the dispenser according to the present invention ensures that the said predetermined amount is not exceeded in any one delivery. Thus, the amount of material dispensed in any single operation of the operating means, e.g., lever or knob, is determined solely by the size of the relevant compartment of the bucket valve and is not influenced by the manner in which the lever or knob is operated, e.g., how quickly or slowly it is turned or how long it is held in the open position. This feature is important when the dispenser is incorporated is a coin-operated vending machine where the cost of the material to be dispensed is an important consideration.

In accordance with the present invention there is provided a dispenser for dispensing predetermined amounts of particulate or granular material, which comprises a funnel-shaped inlet leading downwardly into a dispensing zone, a two compartment bucket valve mounted on a central spindle within the dispensing zone and operating means for tipping the bucket valve from the closed position to a first dispensing position, while simultaneously allowing the unloaded compartment of the bucket valve to be filled from a container located above the inlet, and returning the valve to the closed position and thence to a second dispensing position.

As used herein the term bucket valve in intended to mean a valve device comprising a base and two side walls which, together with a central vertical partition, form two compartments of equal capacity adapted to contain equal predetermined amounts of particulate material, the whole device being tiltably mounted on a central spindle. A preferred configuration for the bucket valve is illustrated in the accompanying drawings.

BRIEF DESCRIPTION OF THE DRAWINGS

In the accompanying drawing wherein like reference characters indicate like parts in the several figures FIG. 1 is a part cut-away perspective view of a dispenser according to the invention;

FIG. 2 is a perspective view of a dispenser illustrated in FIG. 1 but with the operating knob removed and the container lid in position;

In order to control the amount of powder dispensed per operation the dispenser may include a latch mechanism as illustrated in the accompanying drawings, in which

DESCRIPTION OF A PREFERRED EMBODIMENT

Figure 3:
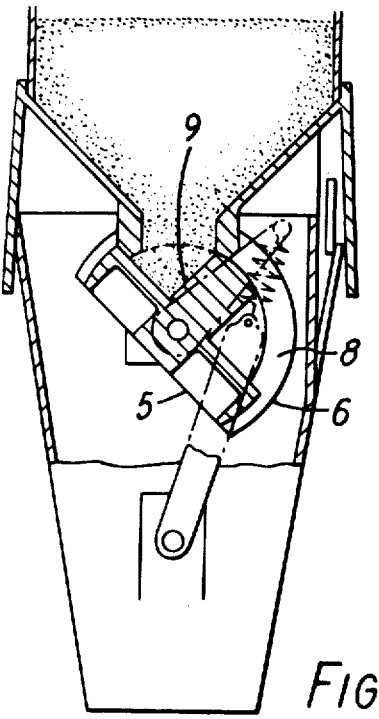
FIGS. 3, 4 and 5 are cut-away elevations showing the dispensing sequence.

The invention will now be particularly described with reference to a preferred embodiment as illustrated in the drawing.

Figure 4:
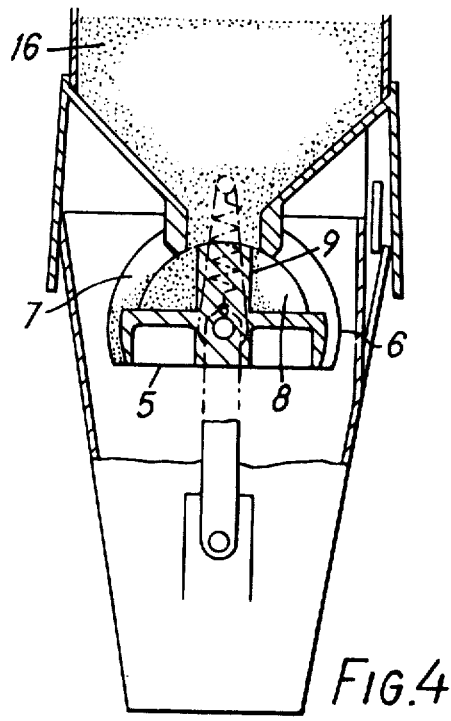

The embodiment illustrated in FIG. 1, which, for the purpose of this description, will be referred to as a sugar dispenser, comprises an inlet tube, 1, extending downwardly into a funnel-shaped inlet, 2. Below the inlet is a dispensing zone, 3, within which is mounted a bucket valve, 4. The bucket valve comprises a base, 5, and side walls, 6, and is divided into two separate compartments, 7 and 8, by a central partition 9, as shown in FIG. 4. The bucket valve is tiltably mounted on a central spindle, 10, connected to a valve shaft, 11, and thence through a spring, 12, to an operating lever, 13, mounted on a drive shaft 14.

Attached to the operating lever and drive shaft is a knob, 15, the operation of which enables the bucket valve to be tilted into one or other of the dispensing positions. Since each compartment of the bucket valve contains an equal amount of sugar, it is immaterial in which direction the operating knob is turned in order to dispense the required amount of sugar.

Figure 5:
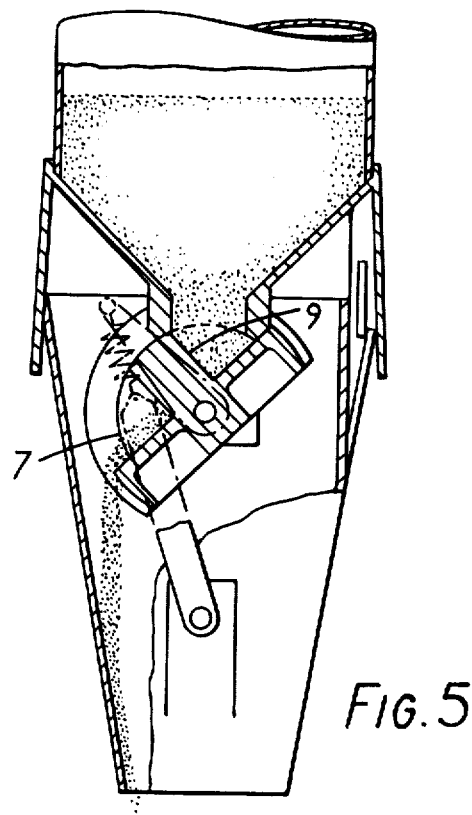

The sugar dispensing sequence is illustrated more clearly in FIGS. 3 to 5. In FIG. 3, compartment 8 has just been emptied and it will be seen that the left wall of the dividing partition, 9, effectively blocks the inlet so that no further sugar above the amount dispensed from compartment 8 is allowed to pass through the dispenser.

In FIG. 4, the bucket valve has been returned to the closed or neutral position and compartment 8 is being filled again by gravity with sugar from the container 16. In FIG. 5, sugar is being dispensed from compartment 7 and the right hand wall of the partition, 9, is blocking the inlet to prevent sugar from the loaded compartment 8 from being dipensed.

Figure 6:
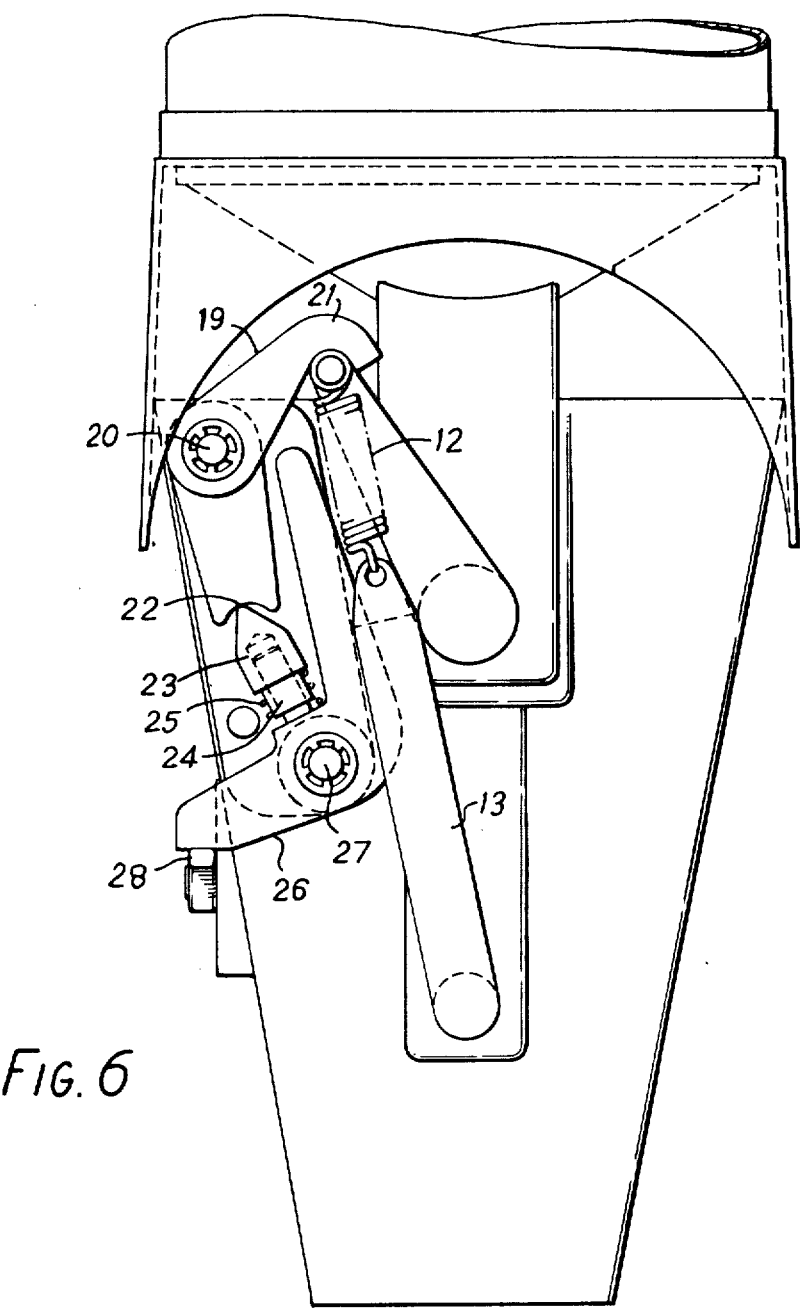
FIG. 6 is a front elevation of a dispenser with a latch mechanism.
Figure 7:
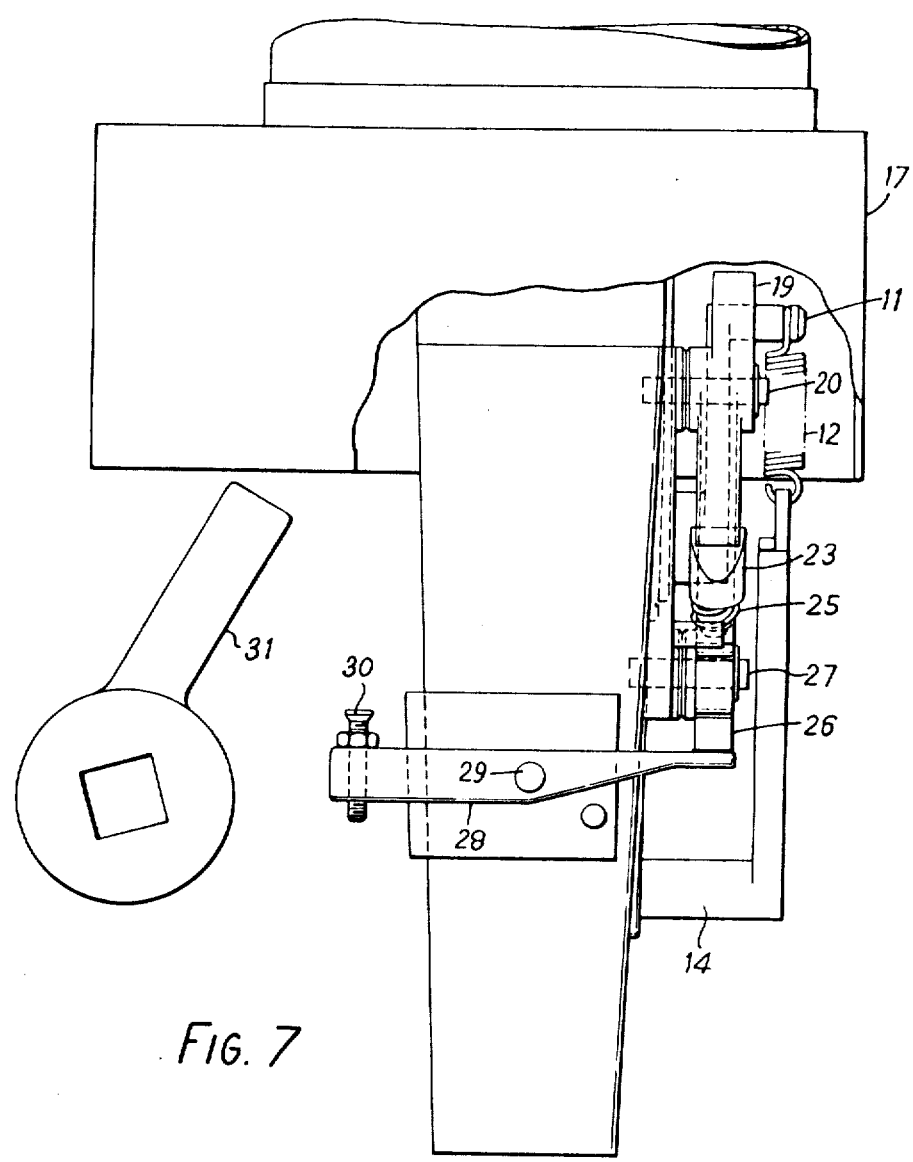
FIG. 7 is a side elevation showing the actuating lever for the latch mechanism.

This further control is provided by a latch mechanism as illustrated in FIG. 6 and FIG. 7 of the accompanying drawings.

As shown in FIG. 6 the latch mechanism comprises an over-center latch member 19 mounted on a pivot 20. The top end of the member forms a latch 21, here shown in the locked position. The lower end of the latch 19 is in the form of a notch 22 in which is located a chisel pointed plunger 23. The plunger is mounted on a central guide pin 24 and is biased by a coil spring 25 against an L-shaped lever 26. The lever 26 is pivoted about a fulcrum 27 and the plunger is biased radially over the fulcrum to provide an over-center effect with respect to the pivot of the latch member.

The latch is actuated by a lever 28 pivoted about a pivot 29. The far end of the actuating lever bears an adjusting screw 30. The actuating lever is operated by an arm 31 which is mounted on a bar of square cross-section forming part of a convention coin-operated mechanism (not shown).

When a coin is inserted in the machine this turns the bar to lower the arm 31 and tilt the actuating lever 28 which in turn throws the L-shaped lever 26 and releases the latch by movement of the plunger in the notch of the latch member. Release of the latch enables the operating lever 13 of the dispenser to be moved by rotation of the knob as described above with respect to FIG. 1.

When the operating lever 13 is returned to the position shown in FIG. 6 it hits the L-shaped lever to knock the plunger to the opposite over-center position and so drop the latch to the lock-position. Preferably a return spring is located in the knob to return the operating lever automatically to the latch-locked position.

By including a latch mechanism as described above the dispenser is restricted to automatic single operation when incorporated in an appropriate coin-operated vending machine.

What is claimed is

1. A dispenser for dispensing predetermined amounts of particulate or granular material, which comprises a funnel-shaped inlet leading downwardly into a dispensing zone, a two-compartment bucket valve comprising a base with two side walls and a central vertical partition, said bucket valve mounted on a central spindle within the dispensing zone and operating means for tipping the bucket valve from a position wherein the granular material is prevented from being dispensed to a first dispensing position wherein a first compartment of the bucket valve dispenses the granular material, while simultaneously allowing a second compartment of the bucket valve to be filled with granular material from a container located above the inlet, and returning the valve to a second dispensing position wherein the second compartment dispenses granular material, while simultaneously allowing the first compartment to be filled with granular material from the container, in said first and second dispensing positions after said first and second compartments respectively dispense granular material further granular material is prevented from being dispensed, and a latch mechanism attached to the operating means and adapted to be released by a coin-operated mechanism and locked upon returning the bucket valve to he second dispensing position.

2. A dispenser according to claim 1 wherein the operating means comprises a valve shaft connected at one end to the central spindle and at the other end attached through a spring to an operating lever mounted on a drive shaft.

3. A dispenser according to claim 2 wherein a rotatable knob is attached to the operating lever so that the rotation of the knob actuates the operating means.

* * * * *